United States Patent [19]

Linde et al.

[11] Patent Number: 4,548,618

[45] Date of Patent: Oct. 22, 1985

[54] PROCESS AND APPARATUS FOR THE SEPARATION OF A MIXTURE OF GASES

[75] Inventors: Gerhard Linde; Wolfgang Schmid, both of Gruenwald; Manfred Boelt, Maisach; Peter S. Burr, Munich, all of Fed. Rep. of Germany

[73] Assignee: Linde Aktiengesellschaft, Wiesbaden, Fed. Rep. of Germany

[21] Appl. No.: 518,587

[22] Filed: Jul. 29, 1983

[30] Foreign Application Priority Data

Jul. 29, 1982 [DE] Fed. Rep. of Germany ....... 3228363
May 2, 1983 [DE] Fed. Rep. of Germany ....... 3315930

[51] Int. Cl.⁴ .............................................. B01D 53/22
[52] U.S. Cl. ........................................ 55/16; 55/68; 55/158; 62/18
[58] Field of Search .................. 55/16, 68, 70, 158; 62/18

[56] References Cited

U.S. PATENT DOCUMENTS

| | | | |
|---|---|---|---|
| 2,583,601 | 1/1952 | Schwertz | 55/16 |
| 3,026,683 | 3/1962 | Palazzo et al. | 55/68 X |
| 3,251,652 | 5/1966 | Pfefferle | 55/16 X |
| 3,324,626 | 6/1967 | Dresser et al. | 55/16 |
| 3,336,730 | 8/1967 | McBride et al. | 55/16 |
| 3,553,972 | 1/1971 | Markbreiter et al. | 62/18 |
| 3,838,553 | 10/1974 | Doherty | 55/68 X |
| 4,180,553 | 12/1979 | Null et al. | 55/16 X |
| 4,229,188 | 10/1980 | Intille | 55/16 |
| 4,238,204 | 12/1980 | Perry | 55/16 |
| 4,255,591 | 3/1981 | Makin et al. | 55/16 X |
| 4,264,328 | 4/1981 | Null | 55/16 |
| 4,266,957 | 5/1981 | Isalski | 62/18 |
| 4,367,135 | 1/1983 | Posey, Jr. | 55/16 X |
| 4,374,657 | 2/1983 | Schendel et al. | 55/16 X |
| 4,398,926 | 8/1983 | Doshi | 55/16 |

OTHER PUBLICATIONS

Mark D. Rosenzweig, *Chemical Engineering*, Unique Membrane System Spurs Gas Separations, Nov. 30, 1981, pp. 62-66, McGraw-Hill.

*Primary Examiner*—Robert Spitzer
*Attorney, Agent, or Firm*—Millen & White

[57] ABSTRACT

A mixture of gases containing hydrogen and at least one further component, for example nitrogen and argon, is enriched in hydrogen in a separation stage by adsorption, or cooling and partial condensation and/or rectification and/or scrubbing. Upstream of this separation stage, at least part of the hydrogen is separated by membrane diffusion, thereby resulting in a highly improved process as compared to using either the separation stage or membrane diffusion alone, especially in connection with gaseous mixtures having components which are to be used at high pressures, e.g., a purge gas from an ammonia synthesis gas process.

18 Claims, 4 Drawing Figures

PROCESS AND APPARATUS FOR THE SEPARATION OF A MIXTURE OF GASES

BACKGROUND OF THE INVENTION

This invention relates to the separation of hydrogen from a mixture of gases containing hydrogen by means of membrane separation combined with adsorption, or with cooling, and partial condensation and/or rectification and/or scrubbing.

A gaseous mixture containing hydrogen is obtained for example as a purge gas in ammonia or methanol synthesis. As the gaseous mixture contains valuable, reusable components, in particular hydrogen, argon and methanol, they are desirably recovered from the gaseous mixture and reused. Furthermore, components detrimental to such reuse are separated from the mixture of gases.

If only hydrogen is to be recovered, the rest of the components of the gaseous mixture is separated by condensation and/or adsorption from the hydrogen. If, on the other hand, other components are also to be recovered, the gaseous mixture is passed to one or several separating stages, in which the individual components are separated by partial condensation and/or rectification and/or scrubbing and withdrawn as overhead or bottoms, depending on their physical properties. The operation of the process usually requires external refrigeration, supplied by a high pressure refrigerating circuit, for example a nitrogen cycle.

Disadvantageous to this process is that substantial amounts of energy must be provided to generate the necessary low temperatures and/or the separated gaseous products can be obtained only at a relatively low pressure. Furthermore, a high pressure refrigeration cycle necessarily involves large expenditures for equipment, e.g., compressors, condenser, conduits and fittings.

SUMMARY

It is therefore an object of the present invention to develop one or more systems for the separation of hydrogen from gaseous mixtures that can be operated in an energy efficient manner and with a low investment in equipment.

Upon further study of the specification and appended claims, further objects and advantages of this invention will become apparent to those skilled in the art.

These objects are attained according to the invention by separating at least part of the hydrogen from the gaseous mixture by diffusion through semipermeable membranes prior to cooling or adsorption, respectively.

The separation of hydrogen by means of semipermeable membranes is known in itself, but it has the disadvantage that the hydrogen suffers a significant loss of pressure during its passage through the membranes so that the process has been considered less than favorable from an energy standpoint. This is particularly the case when high pressure hydrogen is required, such as, for example, in ammonia synthesis gases. Only by means of the combination of two process steps according to the invention, i.e. a diffusion and an adsorption or a low temperature process is it possible to achieve favorable results. For details of known systems for the separation of hydrogen by membrane diffusion, reference is made to U.S. Patent 4,180,553 and to a pertinent article on the subject in the periodical *Chemical Engineering*, November 30, 1981, McGraw-Hill, pp. 62–66, Mark D. Rosenzweig, "Unique Membrane System Spurs Gas Separations".

The process according to the invention is particularly advantageous when the components of the gaseous mixture to be separated have boiling points of not more than approximately 120° K., because then the obtainable economic advantages are especially high.

In a preferred embodiment of the process according to the invention, a maximum of 60% of the hydrogen is separated from the gaseous mixture by membrane diffusion, while the rest of the hydrogen is separated from the other components, the aforementioned other processes, e.g., particularly by partial condensation. Preferably approximately 20–40%, more particularly approximately 30% of the hydrogen is separated by membrane diffusion. If necessary, the non-diffused components are subsequently rectified to recover a certain component, for example, argon.

In accordance with this embodiment of the invention, because the yield of hydrogen in the membrane separation stage is kept low, at not more than 60%, that the necessary membrane exchange surface may be kept small and the loss of pressure suffered by the low pressure fraction in the course of diffusion is relatively low. The remaining high pressure fraction having a low concentration in hydrogen, e.g., 10 to 30% by volume compared to a starting gas having 50 to 60% by volume of hydrogen, is further separated in a subsequent adsorption or condensation process. As in this subsequent process, the hydrogen content of the gas is already relatively low, the investment in equipment may also be kept low.

In another form of embodiment of the process according to the invention, in the course of diffusion more than 60% of the hydrogen is separated from the gaseous mixture and at least one component of the residual gaseous mixture is separated from the rest of the components by rectification or washing. By more than 60% is meant about 61 to 95%, preferably about 65 to 80% of the hydrogen in the gas.

In low temperature separations, the extent of refrigeration and thus the energy to be expended is determined by the partial pressure of the condensable components of the gaseous mixture. The partial pressure of these components is an inverse function of the proportion of hydrogen in the mixture of gases. Consequently, according to the invention, most of the hydrogen is separated by diffusion prior to the low temperature process. Even though there is a loss of energy as the result of the pressure loss of hydrogen during its passage through the semipermeable membranes, since the gaseous mixture that is then cooled and passed to the low temperature separation is largely free of hydrogen, the recovery of the condensable components requires much less energy for the generation of low temperatures then heretofore, so that as a whole, the process is more energy efficient. By "largely free" of hydrogen in this connection is meant generally not more than 10, preferably not more than 8 volume percent of hydrogen in the gaseous mixture.

The process according to the invention has the further advantage that one intermediate pressure, e.g., 5 to 12, preferably 6 to 9 bar refrigerating cycle is sufficient for the generation of low temperatures, so that smaller condensers are adequate for the process.

In a preferred further development of the process according to the invention, the residual gaseous mixture is work expanded, e.g., in a turbine, and brought into heat exchange with liquefied gas from the bottom of the rectification column.

The residual gas mixture low in hydrogen leaves the membrane diffusion stage almost without loss of pressure, e.g., a loss not more than about 3%, preferably less than 2% of the total pressure, the latter being generally about 30 to 150 bar, so that a flow of gas is available with a high pressure potential. This flow of gas is expanded while performing work, whereby the low temperature required for the realization of the subsequent low temperature process is generated. The cooled gas withdrawn from the turbine is brought into heat exchange with the liquefied gas from the sump of a rectification column, which evaporates at least partially in the process. Simultaneously, at least part of the residual gaseous mixture is liquefied in the process.

It is possible, conducting the process in this manner, to effect the reboiling of the bottoms liquid, indispensable for rectification, by means of a gas flow that is already available. The expansion in the expansion machine is taken to a pressure level at which the evaporation of the bottoms liquid is assured. Thus, the high pressure cycle heretofore customarily used for the generation of low temperatures and reboiling may be replaced by a cycle having a substantially lower pressure level, e.g., 5 to 12 bar.

According to another preferred embodiment of the process according to the invention, bottoms liquid from a fractionating column used for the separation of the residual mixture of gases is withdrawn and evaporated under less than atmospheric pressure.

It is a particular advantage to effect the evaporation by means of a supply of heat from a cooling cycle which simultaneously is used for the cooling of a fractionating column, e.g., another fractionating column.

The reduction in pressure makes it possible to select a lower pressure for the cooling cycle. The medium circulating in the cooling circuit is, for example, nitrogen, which in the course of this heat exchange is liquefied. The reduced pressure for the evaporation of the bottom liquid is for example on the order of magnitude of 0.1 to 0.5 bar.

In a further embodiment of the process according to the invention, it is proposed to use a component of the residual gaseous mixture as the fluid circulating in the cooling circuit.

It is of advantage to generate in a further development of the process according to the invention the subatmospheric pressure by jet compression in an ejector using the gaseous component of the partially liquefied residual mixture of gases as the motive power.

Prior to the jet compression, the gaseous component is heated. The flow of gas at reduced pressure is recompressed in the course of the jet compression approximately to the atmospheric pressure.

It is particularly advantageous to conduct the circulating cooling medium to the heads of the fractionating column. The liquefied circulating medium is utilized as reflux and/or for the indirect heat condensing medium in the columns.

The process according to the invention is especially appropriate when the mixture of gases is a purge gas from a gaseous synthesis. Examples of such gas syntheses are the synthesis of ammonia or methanol.

In the specific case of the synthesis of ammonia, the mixture of gases to be separated by the process according to the invention contains as components by volume about 60 to 65% hydrogen, about 8 to 12% methane, about 20 to 23% nitrogen, and about 5 to 10% argon. On the other hand, the invention is generally applicable to the separation of any gas containing by volume about 50 to 70% hydrogen and about 50 to 30% other components.

An apparatus for the operation of the process according to the invention comprises a feed line for the gaseous mixture containing at least heat exchanger means or an adsorber and opening into a separation column, and that upstream of the heat exchanger device or the adsorber, respectively, there is arranged a membrane diffusion installation or stage acting selectively on hydrogen.

BRIEF DESCRIPTION OF FIGURES

The invention and further details of the invention will become more apparent from the examples of embodiment presented hereinafter and illustrated schematically.

FIGS. 1 to 4 show different forms of embodiments of the process according to the invention using as a starting fluid a purge gas from the synthesis of ammonia, and wherein:

FIG. 1 has two fractionating columns downstream of the hydrogen membrane separation stage and has a nitrogen circuit for providing reflux to an Ar-$N_2$ fractionating column;

FIG. 2 is a modification of FIG. 1 comprising an ejector for the withdrawal of methane evaporated at low pressures which in turn permits the use of a low pressure nitrogen cycle as compared to FIG. 1;

FIG. 3 comprises a water scrubber to remove ammonia, with the low temperature removal of components other than hydrogen being condensed by condensation in a heat exchanger; and FIG. 4 is similar to FIG. 1, but with a different nitrogen circuit which provides cooling of the methane separation column as well as the Ar-$N_2$ separation.

DETAILED DESCRIPTION

Figure 1:
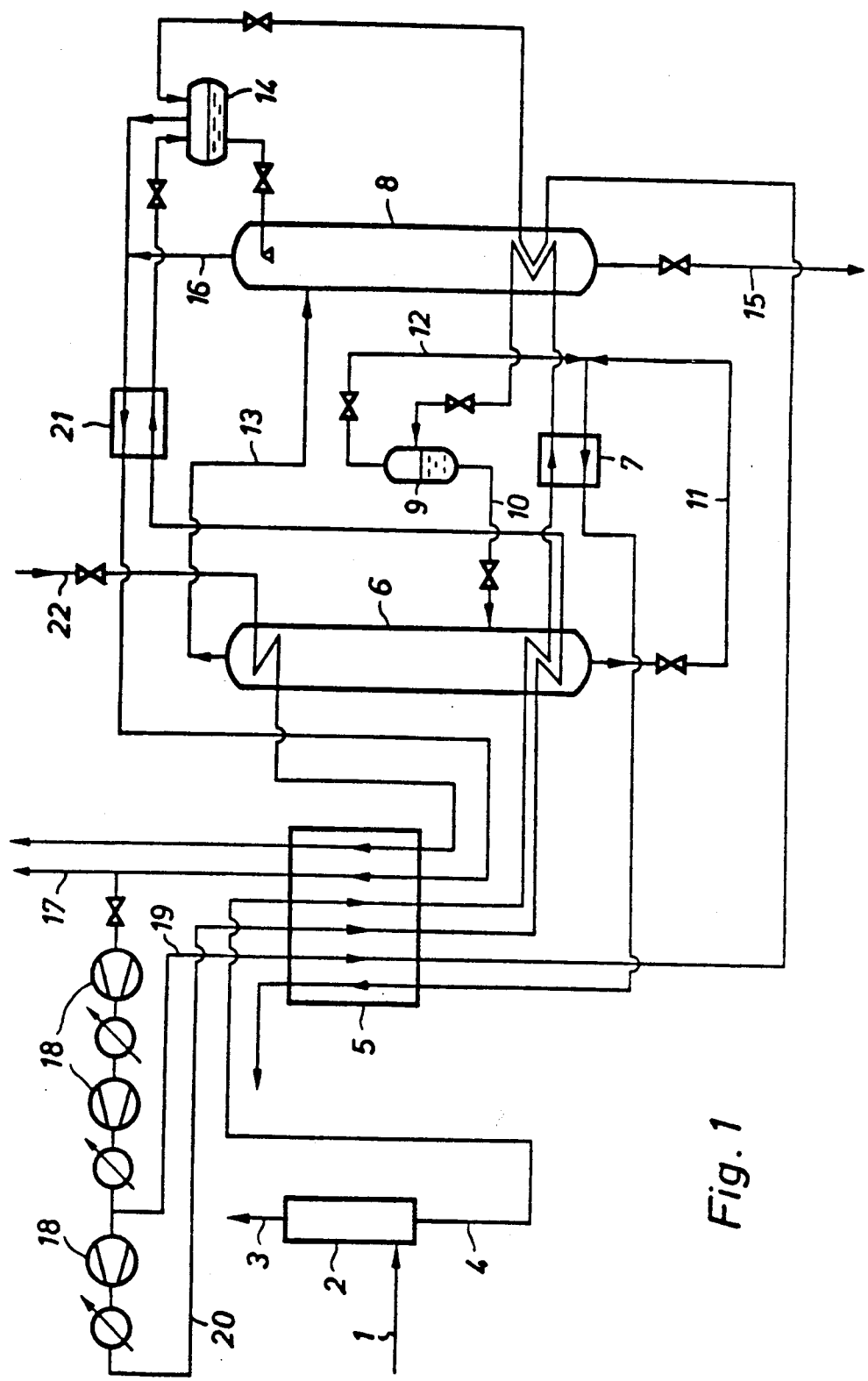

In the process according to FIG. 1, a purge gas 1 (590 $Nm^3/h$) is to be separated into its components; it has a composition of, for example, 62% hydrogen, 20% nitrogen, 11% methane and 7% argon, and is under a pressure of approximately 140 bar and at a temperature of 35° C. In a membrane separation stage 2 containing semipermeable membranes permeable for hydrogen, hydrogen 3 is separated from the purge gas. The pressure of the hydrogen 3, present in a purity of approximately 91%, is still approximately 24 bar.

The semipermeable membrane is of the conventional type for the separation of hydrogen, e.g., cellulose acetate.

The resultant undiffused low hydrogen concentration gas (7% hydrogen, 50% nitrogen, 27% methane, 16% argon at approximately 138 bar and 35° C.) is now passed to the low temperature separation stage. The amount of gas is only 35% of the original purge gas volume so that the low temperature installation may be significantly smaller and less expensive.

In a heat exchanger 5, the raw gas is cooled to approximately 150° K. in heat exchange with a nitrogen cooling circuit and with residual gas from the low temperature separation stage. The cooled raw gas is subsequently cooled further to approximately 95° K. by heating the bottoms of a first fractionating column 6, in a heat exchanger 7, and by heating a second fractionating column 8. The cold gas in expanded and thereby partially liquefied. In a phase separator 9, the liquid components are separated from the gaseous components and expanded through a line 10 into the first fractionating column 6. The fractionating column 6 is operated at a pressure of 2 bar.

In the fractionating column 6, the head of which is cooled by liquid nitrogen 22, the methane is separated as bottoms from the nitrogen and argon which are removed in the gaseous form through the head of the column 6 (line 13). The methane 11 is heated together with the gaseous fraction 12 from the phase separator 9 in the heat exchangers 7 and 5 and removed from the installation. The gaseous fraction 12 includes about, by volume, 50% hydrogen and 50% nitrogen.

The mixture of nitrogen and argon is passed to the fractionating column 8 operated at a pressure of 1.3 bar. As the hydrogen has already been separated, the separation of argon from nitrogen may be effected at a relatively high temperature. The fractionating column 8 is charged with liquid nitrogen from a condensate tank 14. The argon is removed as bottoms from the fractionation column 8 through the line 15 (47 $Nm^3/h$ at approximately 91° K.). Nitrogen 16 is withdrawn from the head of the fractionating column 8 and fed into a nitrogen cooling circuit, with gaseous nitrogen from the tank 14. This mixture of nitrogen streams is heated in a heat exchanger 5 against the circulating nitrogen and in the heat exchanger 5 against the raw gas 4 and the circulating nitrogen, and then it is compressed in a three-stage compressor 18 to approximately 25 to 30 bar. A volume of nitrogen corresponding to that of the nitrogen introduced by the purge gas, is withdrawn via the line 17. Both nitrogen 19 under intermediate pressure from the second and high pressure nitrogen 20 from the third compressor stage are cooled in the heat exchanger 5. The high pressure nitrogen 20 serves to heat the bottom of the first fractionating column 6 and is expanded, after cooling in the heat exchanger 21, in the tank 14 to form nitrogen condensate. The nitrogen 19 under intermediate pressure serves to heat the bottom of the second fractionating column 8 and is also expanded into the tank 14 to form nitrogen condensate.

Figure 2:
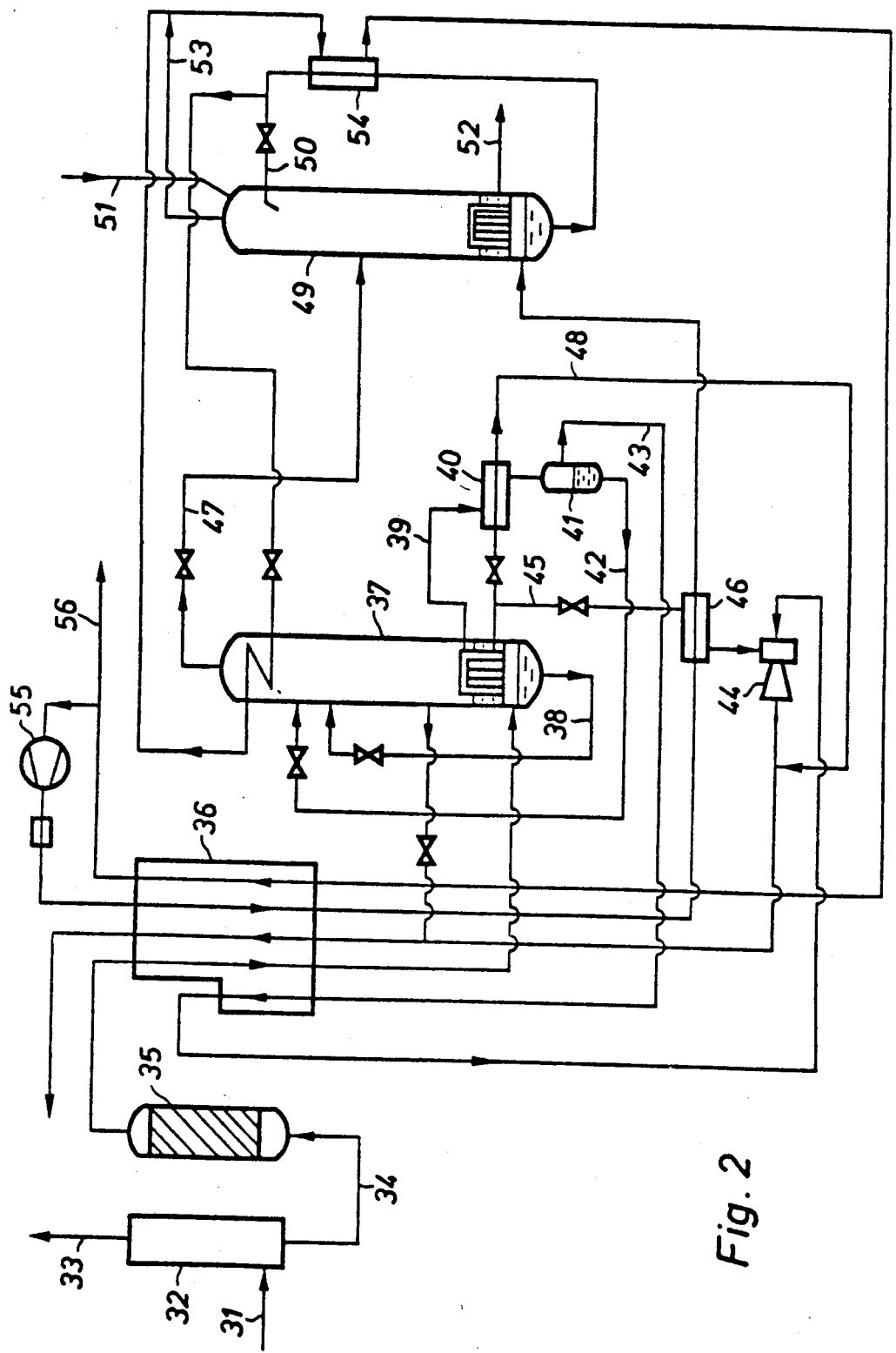

FIG. 2 is a modification of FIG. 1. Purge gas 31 from the ammonia synthesis is separated in a membrane separation installation 32 by diffusion through semipermeable membrane into hydrogen 33 and a residual gas 34 low in hydrogen (for example 6 to 20% under a pressure larger than or equal to 40 bar). Possible traces of ammonia and water are removed in a high purity cleaner 35 which is a molecular sieve adsorber. In a heat exchanger 36, the purge gas is cooled and conducted to a condenser-evaporator in the sump of a first fractionating column 37, in which the purge gas is partially condensed. The liquefied portion 38 is passed to the fractionating column 37, operated at a pressure of approximately 2 bar. The gaseous component 39 is passed to a heat exchanger 40 where it is cooled in heat exchange with expanded bottoms liquid from column 37, whereby part of the gas is condensed and the gas-liquid mixture is fed to a phase separator 41. A liquid fraction 42 from the phase separator 41 is passed into the fractionating column 37. The gaseous fraction 43 from the phase separator essentially contains residual hydrogen and nitrogen. Methane is withdrawn as bottoms from the column 37, while through the head of the column 37 a gaseous mixture containing essentially nitrogen and argon is removed (line 47).

The gaseous fraction 43, under a pressure of approximately 35 bar, is heated in part of the heat exchanger 36 to approximately 180° K. and used to drive an ejector 44 which suctions part of the methane in conduit 45 from the bottom of the column 37 and compresses it to the approximate atmospheric pressure. Prior to compression, the methane is first evaporated at a pressure of approximately 0.3 bar in a heat exchanger 46 against circulating nitrogen. The residual methane 48 from the column 37 is mixed with the methane-hydrogen-nitrogen mixture downstream of the ejector 44 and the resultant mixture is withdrawn from the heat exchanger 36 after being heated therein.

The gas 47 from the head of the first column 37 is conducted to a second fractionating column 49, in which argon as bottoms and nitrogen as overhead are separated from each other. The column 49 is charged with liquid nitrogen 50 from the nitrogen cooling circuit. If necessary, i.e. when liquid argon is removed, additional liquid nitrogen is supplied, for example, from an air separation installation, through the line 51.

From the bottom of the column 49 approximately 300 $Nm^3/h$ argon are taken in liquid form (line 52). If argon is needed in the gaseous form, the additional liquid nitrogen 51 may be omitted.

In this type of embodiment, the low temperature requirements for the separation of argon are relatively low in view of the preceding separation of hydrogen in the membrane separation stage as well as in conduit 43.

Nitrogen 53 is taken from the top of the column 49 and passed to the nitrogen cooling circuit, whereby nitrogen is heated in a heat exchanger 54 against circulating nitrogen and in the heat exchanger 36 against circulating nitrogen and purge gas. The heated nitrogen is then compressed in a compressor 55 to approximately 9 bar and cooled, followed by the removal of the heat of compression in the heat exchanger 36, and then further cooled in the heat exchanger 46 against evaporating methane and then liquefied by yielding its heat to a vaporizer-condenser in the bottom of the column 49. The liquid nitrogen is supercooled in the heat exchanger 54 and fed in part to the column 49, where it supplies the required reflux, and in part is used, after expansion to approximately 1.5 bar, for the indirect cooling of the head of the column 37, in order to provide the required reflux therein. The nitrogen exhaust from the circuit is discharged through the line 56.

Due to the evaporation of methane at reduced pressure in the heat exchanger 46, it is sufficient to compress the nitrogen, in contrast to the process described in FIG. 1, to a pressure of only approximately 9 bar.

Make-up of low temperature cooling for the installation is covered by the Joule-Thompson effect of the raw gas (expansion from approximately 40 bar to 1 bar) if the argon produced is recovered in the gaseous form. The principal advantage compared to the conventional design is that the usual nitrogen circulation, because of the lower pressure of 9 bar (in contrast to a minimum of 25 to 30 bar) may be operated with a relatively inexpensive turbine or screw compressor, in place of an expensive piston compressor. The consumption of energy is lower by approximately 30%.

The ejector used in FIG. 2 is of the conventional type, designed for low temperature use.

Figure 3:
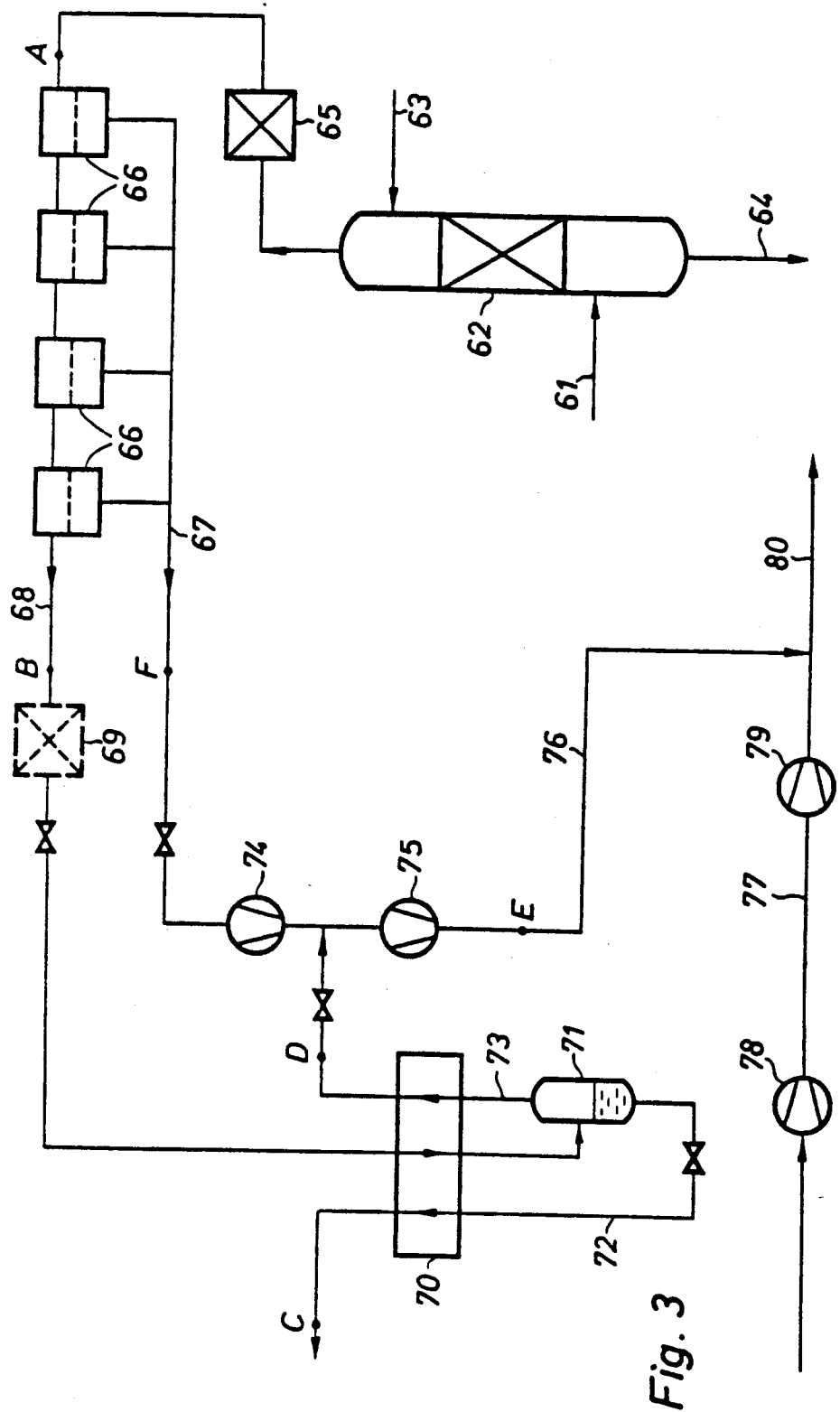

FIG. 3 shows a process for the recovery of hydrogen from the raw gas of an ammonia sythesis. The raw gas 61 is conducted into a scrubber column 62 which is charged with water. The water scrubbing serves to remove the ammonia from the raw gas; it is removed, in the aqueous phase, through line 64 from the scrubber column 62. The raw gas leaves the scrubber column 62 at the top and is passed through a dryer 65 in which the remaining water is removed from the raw gas. The characteristic data of the raw gas after the dryer 65 at point A are given in Table 1.

The raw gas is conducted into a membrane diffusion installation 66, which is formed by four units with parallel flows. Installation 66 contains semipermeable membranes that are permeable to hydrogen. On the low pressure side of installation 66, a fraction 67 concentrated in hydrogen is obtained at a relatively low pressure, while on the high pressure side of the installation 66 a low hydrogen concentration fraction 68 is recovered at a relatively higher pressure. The characteristic data of the gas flows 67, 68 are compiled at points B, F in Table 1.

The dryer 65 may also be placed downstream of the membrane diffusion stage in the line 68 shown as 69 is broken lines, instead of upstream of installation 66. Inasmuch as a large part of the water is separated in the membrane diffusion stage on the one hand, and the volume of downstream gas is smaller, the dryer may also be substantially smaller when situated downstream.

In any case, the hydrogen and water depleted gas is passed via condiut 68 into heat exchanger 70, wherein the relatively high boiling components (as compared to hydrogen) of the gaseous mixture are condensed. In a subsequent phase separator 71, the condensate is separated from the vapor now concentrated in hydrogen. Both the condensate 72 taken from the sump of the phase separator 71 and the remaining gaseous components 73 are passed countercurrently to the gas in conduit 68 in the heat exchanger 70. The characteristic data of these two flows are compiled in points C, D, of Table 1.

The hydrogen 73 is mixed with the hydrogen 67 from the membrane diffusion installation 66, which has been brought to the necessary pressure by means of the compressor 74, and the mixture obtained is compressed in a compressor 75 to 130 bar. The characteristic data at point E are listed in Table 1. The compressed flow of gas 76 is finally mixed with a gas flow 77 of the synthesis process, which essentially contains hydrogen and nitrogen. The gas flow 77 has been compressed previously in two compressors 78, 79 from approximately 25 to approximately 70 and then to 130 bar. The mixture of gas 80 obtained is passed to an ammonia sythesis installation, not shown. A yield of 91.6% is obtained by the process according to the invention, with respect to the total amount of hydrogen in the purge gas.

The compressors 74 and 75 may be omitted if the gas 76 is introduced upstream of either the compressor 78 or the compressor 79 in the flow of gas 77.

The energy required for this process with the numerical values cited in Table 1 amounts to 34.1 KW or 83.6 KW, depending on whether the compressors 74, 75 are included or not. The recovery of hydrogen with a comparable purity and yield exclusively by membrane diffusion would require approximately 126 KW.

TABLE 1

|  | A | B | C | D | E | F |
|---|---|---|---|---|---|---|
| Nm$^3$/H | 3821 | 2996 | 1342 | 1654 | 2479 | 825 |
| bar | 140.6 | 126.5 | 1.5 | 110.0 | 130.0 | 82.6 |
| K | 305 | 305 | 295 | 295 | 305 | 305 |
| mole % H$_2$ | 62.2 | 55.5 | 14.8 | 88.6 | 88.0 | 87.0 |

TABLE 1-continued

|  | A | B | C | D | E | F |
|---|---|---|---|---|---|---|
| N$_2$ | 20.9 | 24.7 | 43.8 | 9.1 | 8.5 | 7.2 |
| CH$_4$ | 10.7 | 12.6 | 27.4 | 0.7 | 1.7 | 3.7 |
| Ar | 6.1 | 7.2 | 14.0 | 1.6 | 1.8 | 2.1 |

Figure 4:
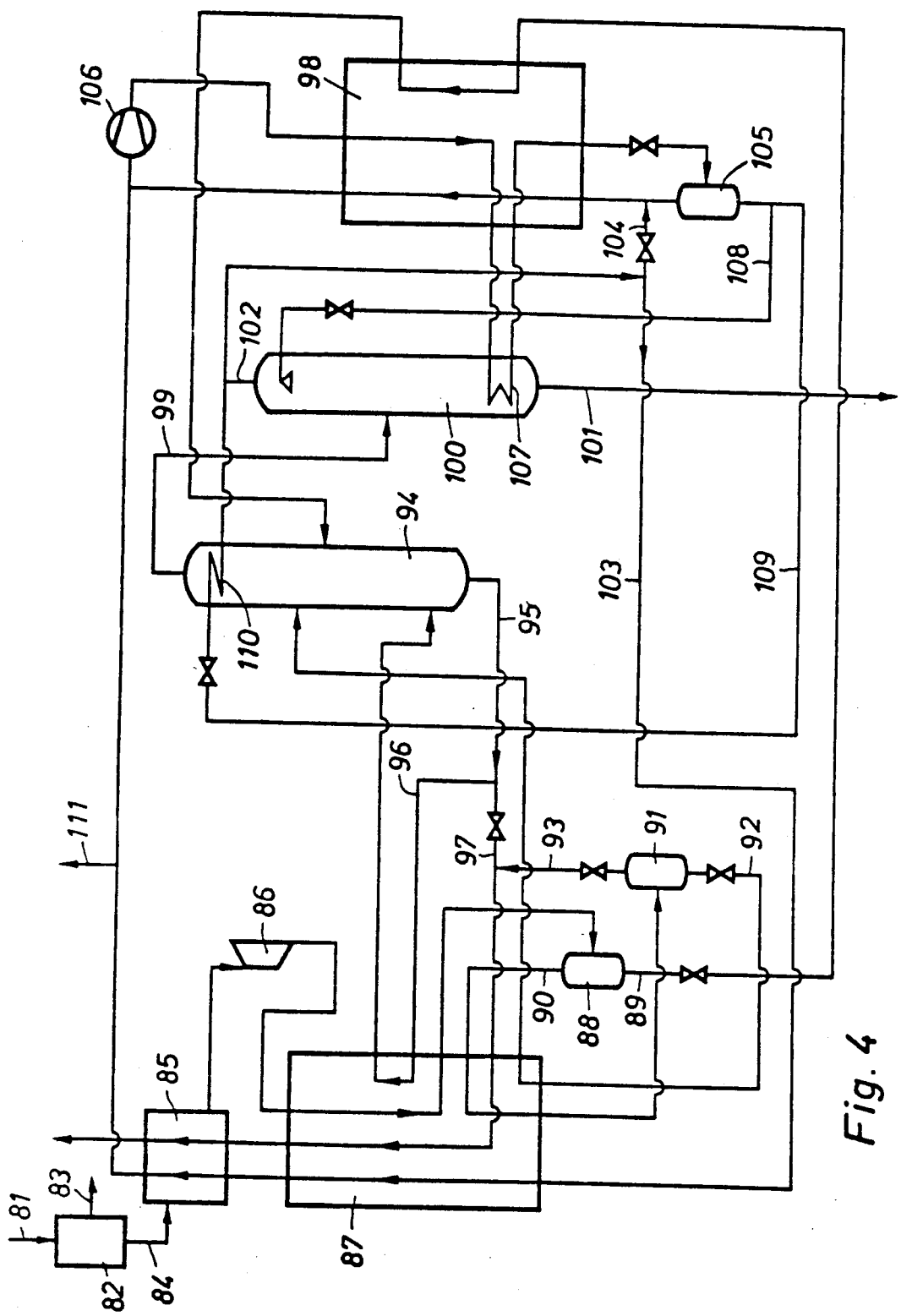

In the process according to FIG. 4, a purge gas 81 of an ammonia synthesis with a composition of, for example 62% H$_2$, 20% N$_2$, 11% CH$_4$ and 7% Ar at a temperature 35° C. and a pressure of 140 bar, is passed to a membrane diffusion installation containing semipermeable membranes. In the diffusion installation 82 most of the hydrogen 83 is separated from the mixture of gases. The remaining gaseous mixture 84 nearly depleted of hydrogen, leaving the membrane diffusion installation 82 has a composition of approximately 13% H$_2$, 52% N$_2$, 10% Ar and 25% CH$_4$. Its pressure is approximately 128 bar. The mixture of gases 84 is cooled in a heat exchanger 85 against separation products to approximately 200° K. and expanded in a expansion turbine 86 to a pressure of 85 to 50 bar, preferably 35 bar. The gaseous mixture is thereby cooled in the process to approximately 145° K.

The exhaust gas of the turbine 86 is conducted into a heat exchanger 87, in which it is further cooled in an exchange of heat with separation products. In particular, this flow of gas is brought into heat exchange with a liquefied gas 96, to be described in more detail hereinbelow, from the sump of a rectification column 94, said liquefied gas being thereby at least partially evaporated.

The gas flow entering the heat exchanger 87 from the turbine 86 is withdrawn from said heat exchanger at an intermediate location from the heat exchanger 87 and passed to a phase separator 88, in which the condensate 89 formed (approximately 23% CH$_4$, 11% Ar, 52% N$_2$) is separated from the remaining gaseous components 90 (mostly hydrogen). The gaseous components 90 are returned at an intermediate location to the heat exchanger 87 and further cooled in an exchange of heat with separation products as well as with the condensate 92 from the phase separator 91. This further cooled stream 90 is then conducted in the phase separator 91. The condensate 92 (approximately 10% CH$_4$, 10% Ar and 73% N$_2$) is partially evaporated in the heat exchanger 87 and passed into the rectification column 94. The gaseous component 93 (approximately 91% H$_2$) from the phase separator 91 is heated together with a part 97 of the bottom product of the rectification column 94 in the heat exchangers 87 and 85 and removed from the installation. The condensate 89 from the phase separator 88 is partially evaporated in a heat exchanger 98 in an exchange of heat with circulating nitrogen and passed in the rectifier column 94. There, a separation is effected forming a high methane, liquid bottoms fraction, withdrawn through the line 95, and a gaseous overhead fraction rich in hydrogen and argon withdrawn through the line 99. A partial stream 96 of the bottoms liquid is evaporated in the heat exchanger 87 in an exchange of heat with the exhaust flow from the turbine 86 and then returned to the rectification column 94.

The overhead stream 99, rich in nitrogen and argon, is conducted from the head of rectification column 94 to a second rectification column 100, in which these two components are separated from each other. Liquid argon (99.99%) is withdrawn as bottoms through the line 101, whereas gaseous nitrogen (92.7% with approximately 7.2% H₂) withdrawn overhead (line 102). The gaseous nitrogen is conducted to a circuit, with part of the nitrogen (line 103) being passed through the heat exchangers 87 and 85, which another part of the nitrogen (line 104), together with gaseous nitrogen from a nitrogen reservoir 105, being conducted through the heat exchanger 98. The two partial streams of nitrogen are recombined after their respective heat exchanges and compressed together in a circulating compressor 106 from approximately 1 to 8 bar. The compressed nitrogen, after being cooled in the heat exchanger 98 in an exchange of heat with nitrogen 104 and the condensate 89, is passed to a reboiler 107 in the sump of the rectification column 100 and following further cooling in the heat exchanger 98, is expanded into the liquid nitrogen reservoir 105.

Liquid nitrogen from the reservoir 105 is used on the one hand (line 108) as reflux for the rectification column 100 and on the other hand (line 109) to cool the head condenser 100 of the rectification column 94. The nitrogen from the head condenser 110 is mixed with the nitrogen product 102 from the rectification column 100. The excess nitrogen is removed through the line 111.

Where the fractionating columns have been employed throughout, other separating means can be substituted, e.g., partial condensers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A process for the separation of hydrogen from a mixture of gases containing about 50 to 70% by volume of hydrogen, said process comprising separating more than 60% of the hydrogen up to 95% from the gaseous mixture by diffusion through a semipermeable membrane, thereby forming a residual mixture of gases depleted in hydrogen, expanding the residual gaseous mixture and passing resultant cooled residual gaseous mixture into indirect heat exchange with liquefied gas, the latter being obtained as bottoms from a rectification stage wherein at least a fraction of said residual gaseous mixture is subjected to rectification downstream of said indirect heat exchange, with the proviso that the process does not comprise a shift reaction.

2. A process according to claim 1, wherein said residual gas is directly cooled and is subjected to a first rectification, and bottoms from said rectification stage is withdrawn and evaporated under subatmospheric pressure.

3. A process according to claim 2, wherein the evaporation is conducted with heat of compression supplied by fluid in a cooling circuit, and resultant cooled fluid is further used as a cooling medium in at least one rectification stage.

4. A process according to claim 3, wherein the fluid circulated in the cooling circuit is a component of the residual mixture of gases.

5. A process according to claim 3, wherein the fluid circulated in the cooling circuit is introduced as reflux to the top of a second rectification stage and to the head condenser of said first rectification stage.

6. A process according to claim 2, wherein the components of the gaseous mixture to be separated have boiling points of not more than approximately 120° K.

7. A process according to claim 2, wherein the subatmospheric pressure is generated by passing a gaseous component of partially liquefied residual mixture of gases through an ejector, as the driving jet.

8. A process according to claim 1, wherein the components of the gaseous mixture to be separated have boiling points of not more than approximately 120° K.

9. A process for the separation of hydrogen from a mixture of gases comprising separating at least part of the hydrogen from the gaseous mixture by diffusion through a semipermeable membrane, thereby forming a residual mixture of gases depleted in hydrogen, and further comprising work expanding the residual gaseous mixture and passing resultant cooled residual gaseous mixture into indirect heat exchange with liquified gas, the latter being obtained as bottoms from a rectification stage wherein at least a fraction of said residual gaseous mixture is subjected to rectification downstream of said indirect heat exchange.

10. A process according to claim 9, wherein the components of the gaseous mixture to be separated have boiling points of not more than approximately 120° K.

11. A process according to claim 9, wherein not more than 60% of the hydrogen is separated from the gaseous by membrane diffusion.

12. A process according to claim 9, wherein more than 60% up to 95% of the hydrogen is separated from the gases by membrane diffusion.

13. A process for the separation of hydrogen from a mixture of gases comprising separating at least part of the hydrogen from the gaseous mixture by diffusion through a semipermeable membrane, thereby forming a residual mixture of gases depleted in hydrogen, directly cooling said residual mixture, subjecting resultant cooled gaseous mixture to a first stage rectification, and withdrawing bottoms from said rectification stage and evaporating said bottoms under subatmospheric pressure.

14. A process according to claim 13, wherein the evaporation is conducted with heat of compression supplied by fluid in a cooling circuit, and resultant cooled fluid is further used as a cooling medium in at least one rectification stage.

15. A process according to claim 14, wherein the fluid circulated in the cooling circuit is a component of the residual mixture of gases.

16. A process according to claim 14, wherein the fluid circulated in the cooling circuit is introduced as reflux to the top of a second rectification stage and to the head condenser of said first rectification stage.

17. A process according to claim 13, wherein the subatmospheric pressure is generated by passing a gaseous component of partially liquefied residual mixture of gases through an ejector, as the driving jet.

18. A process according to claim 13, wherein the components of the gaseous mixture to be separated have boiling points of not more than approximately 120° K.

* * * * *